United States Patent
Fletcher, III

(10) Patent No.: US 7,641,969 B2
(45) Date of Patent: Jan. 5, 2010

(54) OPTICAL FIBER PREFORM WITH OVERCLAD TUBES

(76) Inventor: Joseph P. Fletcher, III, 1948 Willeo Creek Point, Marietta, GA (US) 30068

(*) Notice: Subject to any disclaimer, the term of this patent is extended or adjusted under 35 U.S.C. 154(b) by 611 days.

(21) Appl. No.: 11/088,076

(22) Filed: Mar. 23, 2005

(65) Prior Publication Data
US 2006/0216527 A1    Sep. 28, 2006

(51) Int. Cl.
*G02B 6/036* (2006.01)
*D02G 3/22* (2006.01)

(52) U.S. Cl. .............. 428/364; 385/124; 385/144; 385/126

(58) Field of Classification Search .......... 65/403, 65/407, 412, 435; 428/542.8, 293.4, 359, 428/364, 403; 385/123, 141, 142, 143, 144, 385/145, 124, 125, 126, 127, 128
See application file for complete search history.

(56) References Cited

U.S. PATENT DOCUMENTS

| | | | |
|---|---|---|---|
| 4,195,980 A | | 4/1980 | Sterling et al. |
| 4,407,667 A | | 10/1983 | Le Noane et al. |
| 6,434,975 B2 | | 8/2002 | Berkey |
| 6,460,378 B1 | * | 10/2002 | Dong et al. .......... 65/412 |
| 2001/0008077 A1 | * | 7/2001 | Berkey .......... 65/403 |
| 2003/0140659 A1 | * | 7/2003 | Fabian .......... 65/412 |
| 2004/0065119 A1 | * | 4/2004 | Xiong et al. .......... 65/412 |
| 2004/0107735 A1 | | 6/2004 | Fletcher et al. |
| 2005/0092030 A1 | * | 5/2005 | Balakrishnan et al. .......... 65/421 |

FOREIGN PATENT DOCUMENTS

| | | |
|---|---|---|
| EP | 1182173 A1 | 2/2002 |
| JP | 57 067040 | 4/1982 |
| JP | 58 074534 | 5/1983 |
| JP | 58 084137 | 5/1983 |
| JP | 2000063148 A | 2/2000 |

OTHER PUBLICATIONS

Weik ("Fiber Optics Standard Dictionary").*

* cited by examiner

*Primary Examiner*—Timothy M Speer
*Assistant Examiner*—Lauren Robinson

(57) ABSTRACT

An optical fiber preform is assembled by inserting core rod segments axially end to end inside of a first glass overclad tube having a first, relatively low concentration of a given impurity that contributes to signal attenuation in an optical fiber to be drawn from the preform. The first overclad tube with the contained core rod segments are inserted in a second glass tube having a second concentration of the given impurity which is higher than the first concentration. The wall thickness of the first overclad tube is preferably less than that of the second overclad tube, thus reducing the amount of high purity glass needed to form the first overclad tube and attendant manufacturing costs. The core rod segments may include salvageable remnants from a single long core rod produced, for example, by vapor axial deposition (VAD).

10 Claims, 6 Drawing Sheets

OPTICAL FIBER PREFORM WITH OVERCLAD TUBES

BACKGROUND OF THE INVENTION

1. Field of the Invention

This invention relates to optical fiber preforms, and particularly to preforms that are prepared with multiple overclad tubes.

2. Discussion of the Known Art

Optical fibers for data and information transmission are typically produced by lowering one end of a glass fiber preform into the mouth of a vertical fiber draw furnace, and heating the preform as it descends through a hot zone inside the furnace. A drop of soft glass forms at the heated end of the preform, and an optical fiber is drawn from the soft drop. The preform may be assembled using a so-called rod-in-tube (RIT) technique.

In a RIT preform, a solid glass rod is supported axially inside a cylindrical glass overclad tube. The rod may be comprised only of core material, or possess a circumferential outer layer of cladding material. The overclad tube thus acts as a source of outer cladding on fibers that are drawn from the assembled rod and tube. The glass rod is referred to hereafter simply as a "core" rod, even though the rod typically possesses an outer layer of cladding material.

During fiber draw, the tube is heated until it softens and collapses about the rod, and the tube glass consolidates with the outer glass layer on the rod. An optical fiber with a relatively thick outer cladding layer may then be drawn from the consolidated rod and tube. This drawing process is sometimes referred to as overclad during draw or simply ODD. See also U.S. Pat. No. 6,460,378 (Oct. 8, 2002) entitled "Collapsing a Multitube Assembly and Subsequent Optical Fiber Drawing in the Same Furnace", and commonly owned U.S. patent application Ser. No. 10/309,852 filed Dec. 4, 2002, entitled "Rod in Tube Optical Fiber Preform and Method". All relevant portions of the mentioned '378 patent and the '852 application are incorporated by reference.

According to one embodiment disclosed in the '378 patent, a core rod is placed inside a first overclad tube, and a second overclad tube is arranged over the first overclad tube. The core rod and the two overclad tubes are heated under such conditions as to cause a partial collapse of the tubes at one end of the rod, thus forming a unitary multiple overclad preform. The one end of the preform is later set up for insertion into a vertical fiber draw furnace. An ODD fiber having a desired cladding to core mass ratio is then drawn inside the furnace as the tubes collapse further and consolidate with the core rod.

Because lengths of suitable core rods are typically much shorter than the uncut lengths of commercially available overclad tubes, it has been common practice to stack a sacrificial glass spacer rod above the core rod to obtain a "total" inner core length that matches the length of the overclad tube. Once all the material of the core rod is drawn into the core of an optical fiber, however, the remaining portion of the preform must be wasted. Accordingly, this procedure does not lend itself to a low cost and robust manufacturing process.

It is also known to weld a number of core rod segments axially in line end to end, to form a continuous long core rod. See, U.S. Pat. No. 4,195,980 (Apr. 1, 1980), and U.S. Pat. No. 4,407,667 (Oct. 4, 1983). This is a costly extra processing step, however, and negatively affects fiber quality in regions around the weld, i.e., added hydroxyl (OH) concentrations are produced by the welding heat source. See also, U.S. Pat. No. 6,434,975 (Aug. 20, 2002) disclosing a preform for producing a dispersion managed (DM) optical fiber, wherein the preform is assembled by selectively inserting a number of core rod tablets into a cladding glass tube, with adjacent tablets having different optical characteristics.

The use of larger preform sizes both in length and diameter, can yield cost benefits. As mentioned, the effective length of the core rod determines the useful length of the preform. But manufacturing long rods of core material, e.g., more than two meters in length, is difficult due to defects such as the formation of bubbles or deviations in optical properties beyond specified limits. Typically, only relatively short remnants will remain after defective portions of a single long core rod are cut away.

When preparing large size preforms of the overclad tube variety, satisfactory interfacial glass quality must be achieved. The interface between the outer circumference of the core rod and the inner circumference of the first overclad tube is critical, and must meet stringent material property requirements. For example, the concentration of hydroxyl (OH) ions or "water" greatly affects signal attenuation through so-called zero or low water peak (1383 nm) optical fiber. This requires that the first overclad tube be formed from an expensive high purity glass, as well as a large quantity of such glass if only one overclad tube is used for the preform. Other elements or ions that can act as impurities at the interface and, thus contribute to light signal attenuation through the drawn fiber include, without limitation, Chlorine (Cl), Al, Fe, Ca, Mg, K, Na, Li, Ni, Cr, Cu, Ti, V and Zn. See, R. H. Doremus, Glass Science (1973) at page 321, which is incorporated by reference.

SUMMARY OF THE INVENTION

According to the invention, an overclad optical fiber preform includes a first glass overclad tube having a tube axis, and a number of core rod segments arranged axially end to end inside the first overclad tube. The tube has a first concentration of a given impurity at an interface with the core rod segments, the impurity contributing to signal attenuation in a fiber to be drawn from the preform. A second glass overclad tube is disposed coaxially about the first overclad tube, and has a second concentration of the given impurity which is larger than the first concentration of the impurity.

According to another aspect of the invention, a method of assembling an optical fiber preform includes inserting a plurality of core rod segments axially end to end inside a first glass overclad tube having an axis, and a first concentration of a given impurity at an interface with the core rod segments, the impurity contributing to signal attenuation in a fiber to be drawn from the preform. The first overclad tube and the core rod segments are inserted inside a second glass overclad tube having a second concentration of the given impurity which is larger than the first concentration of the impurity.

For a better understanding of the invention, reference is made to the following description taken in conjunction with the accompanying drawing and the appended claims.

DETAILED DESCRIPTION OF THE INVENTION

Figure 1:
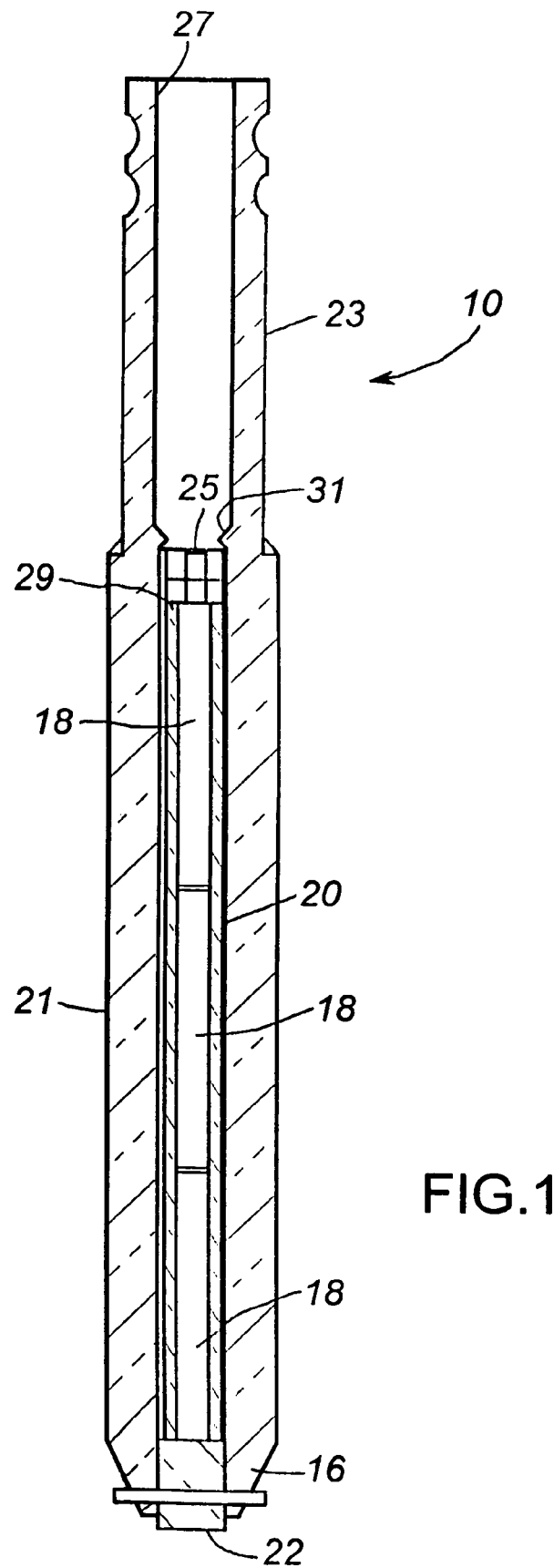
FIG. 1 is cross-sectional view, in elevation, of an optical fiber preform according to the invention.
Figure 2:
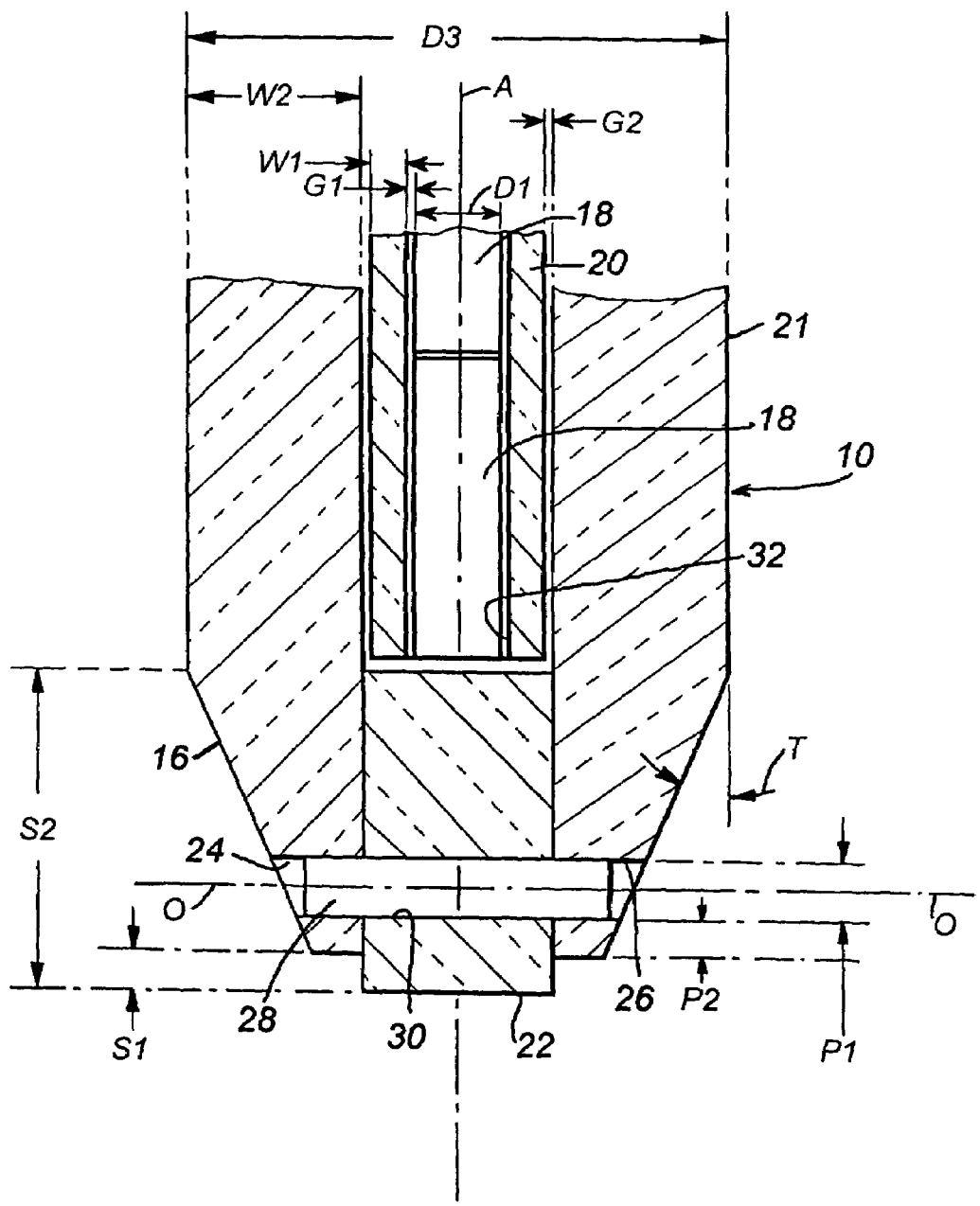
FIG. 2 is a detailed cross-sectional view of a lower portion of the preform in FIG. 1.

FIG. 1 shows an optical fiber preform 10 according to the invention. FIG. 2 is an enlarged cross section of a lower portion of the preform 10 in FIG. 1. Basically, the preform 10 includes a number of cylindrical core rod segments 18 that are stacked axially end to end inside a first glass overclad tube 20. The rod segments 18 may originate from a single long cladded core rod produced by a known modified chemical vapor deposition (MCVD) process, or by an equivalent process such as, without limitation, vapor axial deposition (VAD) or outside vapor deposition (OVD). Alternatively, each of the rod segments 18 may comprise uncladded fiber core material only. The axial end faces of the segments 18 are preferably cut flat using, e.g., a diamond saw.

Figure 6:
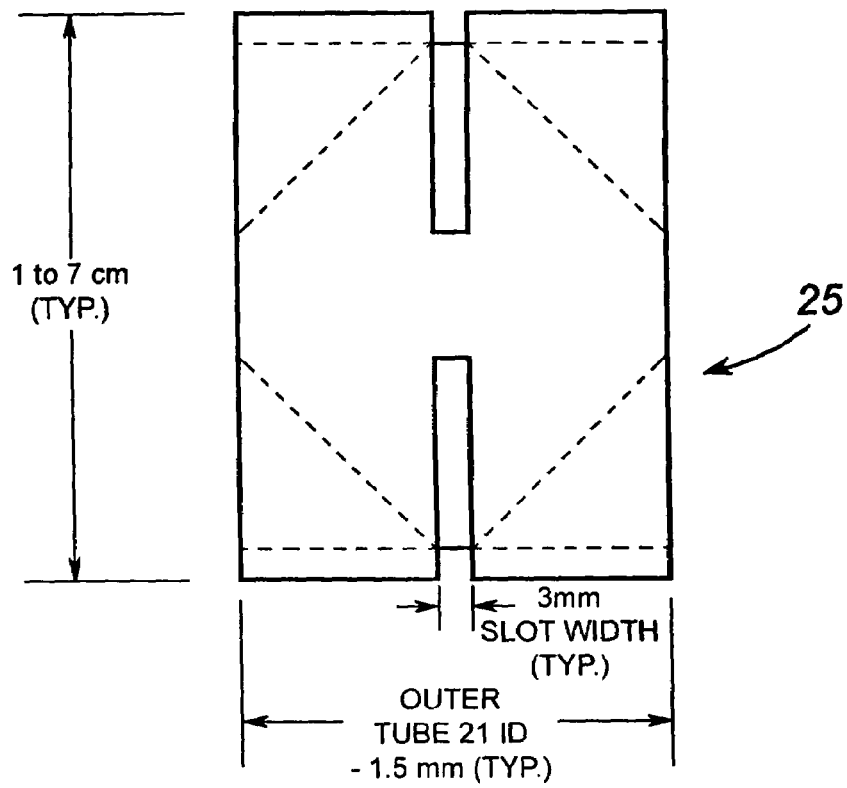
FIG. 6 is an enlarged view of a spacer that forms a part of the preform, in elevation.
Figure 7:
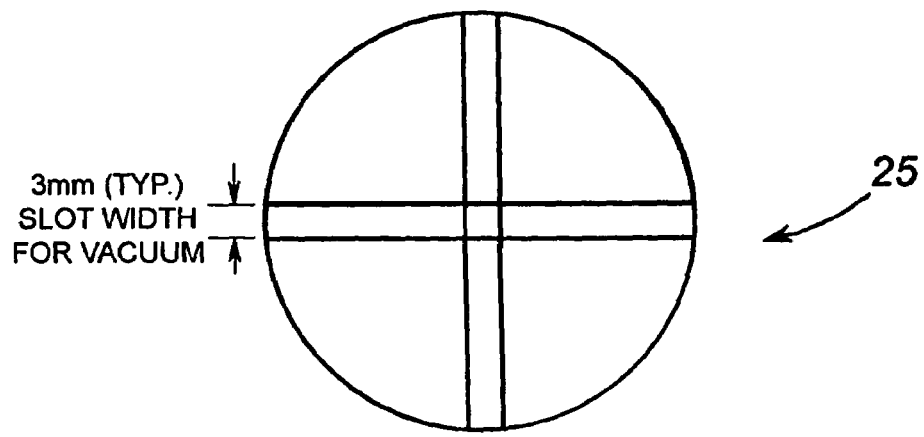
FIG. 7 is a top view of the spacer in FIG. 6.

The first overclad tube 20 is aligned axially inside of a second overclad tube 21. The second overclad tube 21 may be obtained in the form of a commercially available silica glass cylinder. The circumference of a distal or lower end 16 of the tube 21 as viewed in the drawing is preferably formed to a frustoconical shape with a radially inward taper T (FIG. 2) of, e.g., approximately 24 degrees. A hollow cylindrical handle 23 (see FIG. 1) is formed at the top of the tube 21, and a short glass spacer 25 is seated at the bottom of an axial bore 27 in the handle 23. The spacer 25, shown in enlarged views in FIGS. 6 and 7, is constructed and arranged to cap a top end 29 of the first overclad tube 20 and block upward movement of the core rod segments 18 inside the tube. Preferably, the spacer 25 is inserted axially from the bottom end of the second overclad tube 21, to a position where the spacer is blocked from further movement into the bore 27 of the tube handle 23 by, e.g., an annular protrusion or radial step 31 formed at the bottom of the handle bore 27. The spacer 25 therefore also serves to stop the first overclad tube 20 from movement into the handle bore 27.

It has been discovered that the glass forming the second overclad tube 21 may contain a higher concentration of a given impurity than the concentration of the same impurity in the first overclad tube 20, without causing any significant increase in signal attenuation through a fiber drawn from the assembled preform 10. For example, the ambient surroundings introduce approximately 2 parts per million (ppm) of OH at the interface between the outer circumference of a core rod and the inner circumference of a first overclad tube. This OH concentration, together with residual OH present in the core rod and typical Rayleigh scattering losses, can be shown to account for about 0.28 dB of attenuation per kilometer (km) of the drawn fiber at a wavelength of 1383 nm. By using a high purity glass with a low OH concentration of, e.g., about 0.2 ppm for the glass of the first overclad tube, the OH adds about 0.002 dB/km attenuation. But if the second overclad tube is formed from glass having an OH concentration as high as 5.0 ppm, only about 0.00015 dB/km of fiber attenuation has been found to be attributable to the OH in the second overclad tube.

Accordingly, the first overclad tube 20 is preferably formed of high quality glass, but with a relatively thin tube wall (e.g., between about 4 and 6 mm) so as to minimize costs. The second overclad tube 21 may have a substantially greater wall thickness (e.g., about 28 mm) to achieve a desired cladding to core mass ratio for the drawn fiber, and yet be formed from glass costing appreciably less than the glass of the first overclad tube 20.

Figure 3:
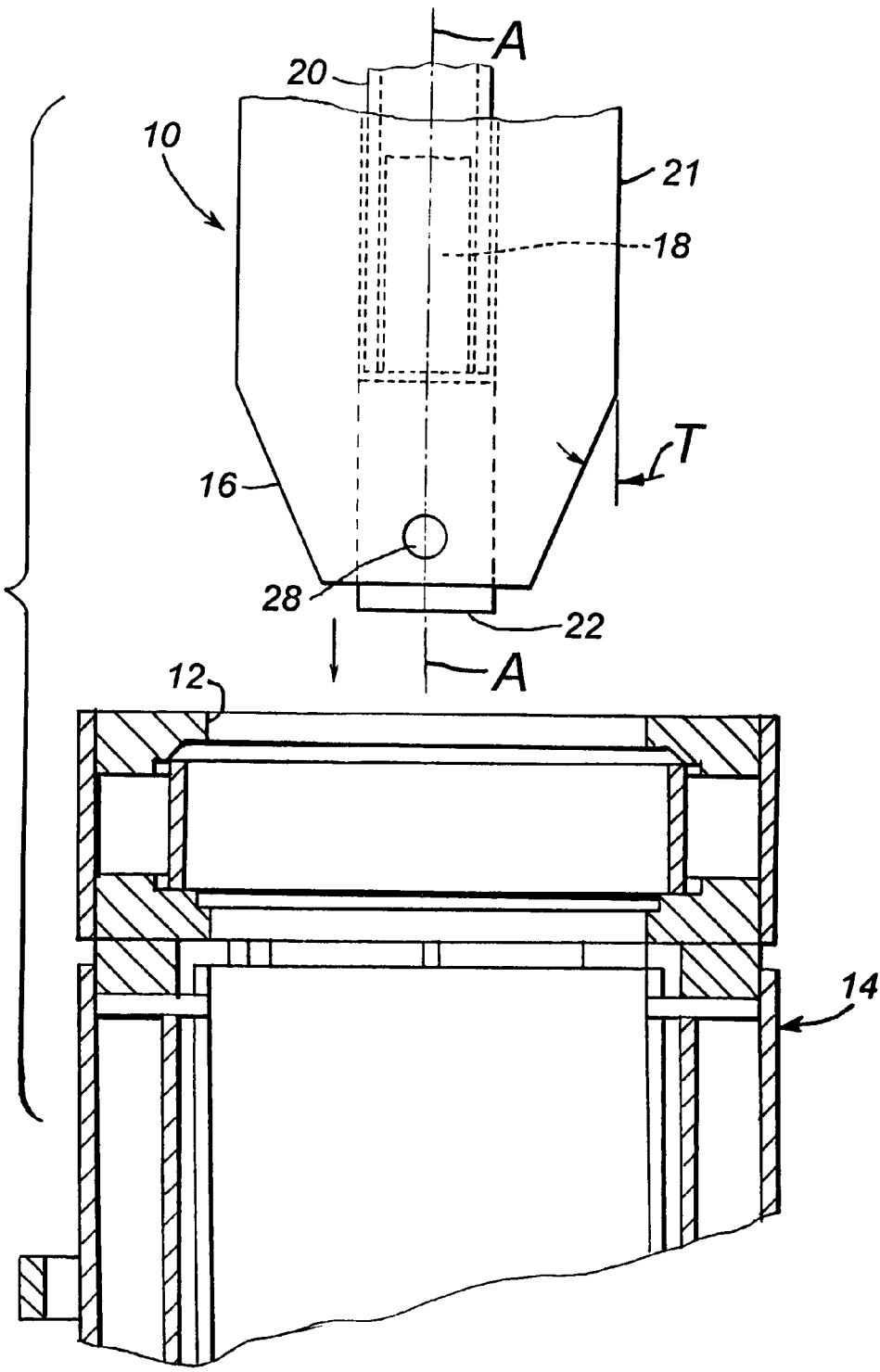
FIG. 3 shows the lower portion of the preform when rotated 90 degrees about its axis with respect to the view in FIG. 2, prior to insertion in a vertical draw furnace.

The upper half of FIG. 3 shows the lower portion of the preform 10 as seen when rotated 90 degrees about its long axis A with respect to the view in FIG. 2. As represented in FIG. 3, the lower end 16 of the entire fiber preform 10 can be positioned as a stable mechanical assembly for insertion into a mouth 12 of a vertical fiber draw furnace 14 at the beginning of a fiber draw process.

Figure 4:
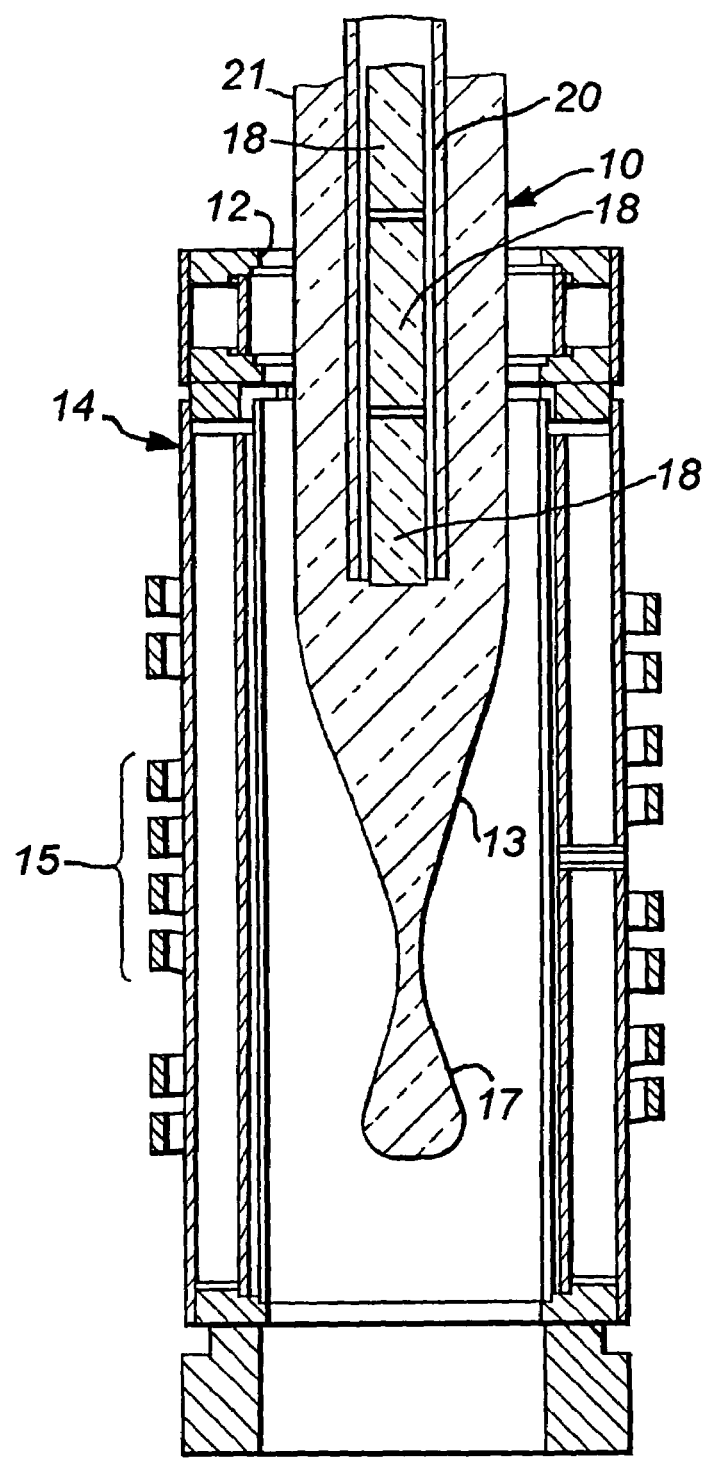
FIG. 4 is a cross-sectional view of the lower portion of the preform after descending into a hot zone of the furnace in FIG. 3, showing the formation of a soft drop for fiber draw.

The taper angle T approximates a neck down inclination 13, shown in FIG. 4, which is assumed by the lower end of the preform 10 when the end softens in a hot zone 15 of the fiber draw furnace 14, thus forming a soft glass drop 17. A proper choice for the taper angle T can maximize the usable axial length of the preform 10 for fiber draw, and may also minimize the size of the drop 17 so as to facilitate the initiation of fiber draw from the preform.

In the disclosed embodiment, a cylindrical plug 22 is supported inside the open distal end of the second glass overclad tube 21 as shown in FIGS. 1 to 3. The plug 22 is formed, e.g., from commercially available natural or synthetic fused silica, or equivalent material. Openings 24, 26 (FIG. 2) are drilled or otherwise formed through the conically shaped wall of the tube 21 at diametrically opposed locations at the lower end of the tube, and along an axis O perpendicular to the tube axis A. The plug 22 is fixed with respect to the tube 21 by a pin 28 which is inserted through one of the openings 24, 26, and passes through a transverse bore 30 in the plug to engage the opposite one of the openings 26, 24 in the tube wall. The pin 28 is formed from, e.g., commercially available synthetic fused silica or equivalent material.

To assemble the preform 10, the spacer 25 is inserted axially through the lower or distal end of the second overclad tube 21, followed by the first overclad tube 20 including the core rod segments 18, and then the plug 22. In a preferred assembly procedure, the spacer 25, core rod segments 18 and plug 22 are initially loaded axially into an elongated tubular holder, wherein plastics balls or spacers are disposed (a) between confronting axial end faces of the segments, (b) between the spacer 25 and an uppermost rod segment, and (c) between the plug 22 and a lowermost rod segment. This procedure allows the spacer 25, the core rod segments 18, and the plug 22 to be washed clean by flowing, e.g., HF acid between open front and rear axial ends of the tubular holder followed by a rinse using deionized water. The plastics spacers act as a cushion between the glass parts 25, 18, 22, and thus prevent the parts from scratching during the cleaning process.

When cleaning is completed, the spacer 25 may be displaced from the front end of the holder and inserted in the open distal end of the second overclad tube 21. The first overclad tube 20 is then aligned with the holder, and the core rod segments 18 are urged successively into the tube 20 by, for example, a push rod inserted through the rear end of the holder in such a manner that the plastics spacers are allowed to fall away or are otherwise removed as successive ones of the segments 18 are inserted axially end to end inside the first overclad tube 20.

Once all core rod segments 18 are inserted in the first overclad tube 20, the tube 20 is inserted axially into the second overclad tube 21 until the proximal or top end of the tube 20 confronts the spacer 25 and urges the spacer toward the protrusion 31 in the handle bore 27. The plug 22 is then placed in the distal end of the tube 21 so that opposite ends of the plug bore 30 register with the openings 24, 26 in the tapered tube wall, and the pin 28 is inserted through the plug bore and the wall openings to fix the plug at the distal end of the tube 21. Preferably, the rod segments 18 and the first overclad tube 20 are dimensioned so that a radial clearance gap G1 of, for example, approximately 1 mm+/−0.5 mm exists between the inner periphery of the tube 20 and the outer periphery of the inserted rod segments 18. Depending on the circumstances, a larger gap may be deployed.

When the assembled optical fiber preform 10 is vertically oriented as shown in FIG. 3 for set up prior to entering the furnace 14, a lowermost rod segment 18 is blocked by the plug 22 from dropping out of the open bottom end 32 (see FIG. 2) of the tube 20. After passing through the mouth 12 of the draw furnace and descending through the furnace hot zone 15 as shown in FIG. 4, the lower end of the preform 10 is heated to a temperature (typically at least 2100 degrees C.) at which glass softens, and the plug 22 and the pin 28 in FIG. 3 melt and fuse with one another. The lowermost core rod segment 18 and a portion of the first overclad tube 20 also soften above the plug 22. The overclad tube 21 then collapses onto the tube 20, and the tube 20 collapses onto the softened rod segment to produce the drop 17. The collapsing steps may be assisted by communicating a partial vacuum of, for example, about −26 inches Hg to the clearance gap G1 between the rod segments 18 and the first overclad tube 20 at an upper end of the preform 10, in a manner typically employed when carrying out conventional RIT processes. The vacuum is also preferably communicated to another radial gap G2 formed between the first and the second tubes 20, 21, by way of, e.g., grooves or passages formed in the spacer 25. See FIGS. 6 and 7. Once the drop 17 is produced, a continuous optical fiber may be drawn in the furnace 14 in a conventional manner.

In accordance with the invention, the preform 10 may be assembled with relative ease and without the need for a separate heating step to join parts of the preform to one another prior to fiber draw. By eliminating such prior step(s), manufacturing costs are significantly reduced and the yield obtained from the preform 10 increases. Moreover, various preform sizes and fiber types (e.g., single or multi-mode) can be realized by the present invention.

Once assembled, the preform 10 may be placed in a furnace and heated only until the first and the second overclad tubes 20, 21 collapse about the core rod segments 18. The preform may then be removed from the furnace for later use in a production fiber draw furnace.

Typical dimensions, taper angles and OH concentrations for embodiments of the preform 10 having outer diameters D3 ranging from 90 mm to 150 mm, are listed in the following Tables I to III with reference to FIG. 2.

TABLE I

| | |
|---|---|
| D1 (O.D. of rod segments 18) | 21 mm to 32 mm |
| D2 (O.D. of first overclad tube 20) | 32 mm to 54 mm |
| D3 (O.D. of second overclad tube 21) | 90 mm to 150 mm |
| W1 (wall thickness of tube 20) | 5 mm to 10.5 mm |
| W2 (wall thickness of tube 21) | 28.5 mm to 47.5 mm |
| G1 (gap) | 1 +/− 0.5 mm (typ.) |
| G2 (gap) | 1 +/− 0.5 mm (typ.) |
| S1 (axial length of exposed end of plug 22) | 5 mm to 10 mm |
| S2 (axial length of plug 22) | (axial length of tapered portion + S1) |
| P1 (diameter of pin 28) | 9.75 mm to 15.75 mm |
| P2 (axial spacing between bottom of pin bore 30 and distal end of tube 20) | 15 mm to 20 mm |

TABLE II

| Taper Angle | |
|---|---|
| T | 24 to 27 degrees (approx) |

TABLE III

| | |
|---|---|
| OH concentration in first tube 20 | ≦0.3 ppm |
| OH concentration in second tube 21 | ≧1.0 ppm |

Figure 5:
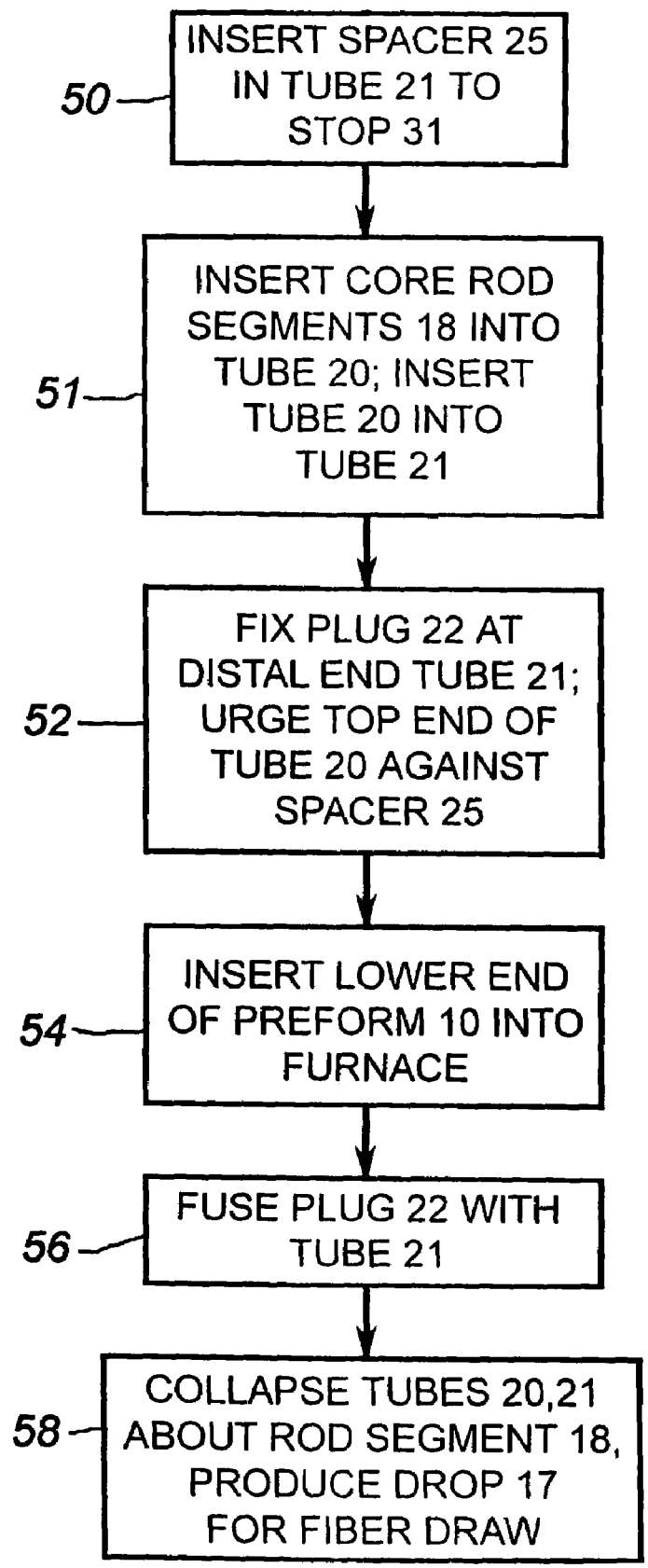
FIG. 5 is a functional block diagram showing steps of assembling the preform, and of drawing an optical fiber from the preform, according to the invention.

FIG. 5 shows steps of a method of assembling an optical fiber preform, and of setting up the preform for fiber draw, according to the invention.

In step 50, the spacer 25 is inserted through the distal end of the second overclad tube 21 and placed at a stop position next to the protrusion 31. In step 51, the first overclad tube 20 is inserted in the second overclad tube 21, and the core rod segments 18 are fed successively into the open distal end of the tube 20. In step 52, the plug 22 is inserted and fixed by the pin 28 at the distal end of the second overclad tube 21, thus urging the proximal end of the first overclad tube 20 against the spacer 25 and preventing the rod segments from falling out of the distal end 32 of the first overclad tube 20. In step 54, the lower end 16 of the assembled preform 10 is inserted into a furnace, e.g., the draw furnace 14 in FIGS. 3 and 4.

The lower end 16 of the preform 10 descends into the furnace hot zone and is heated, in step 56, until the plug 22 fuses with the surrounding portion of the second overclad tube 21. In step 58, the tubes 20, 21 collapse about a softened, lowermost core rod segment 18, thereby producing the drop 17 (FIG. 4) for initiating a draw of an optical fiber having desired properties.

As mentioned, the partial vacuum communicated to the radial gap G1 between the rod segments 18 and the first overclad tube 20, is also communicated also through the spacer 25 to the radial gap G2 between the second overclad tube 21 and the first overclad tube 20. This facilitates the collapse of the tube 21 onto the tube 20 when the preform 10 is heated in a furnace. Like the gap G1, gap G2 is preferably about 1+/−0.5 mm in size.

Because it is important that all of the core rod segments 18 and the associated overclad tubes 20, 21 descend in unison and at the same rate through the furnace hot zone during fiber draw, it is desirable to provide means for blocking potential upward vertical movement or slippage of the rod segments 18 with respect to the overclad tubes. Blocking means at the top of the first overclad tube 20 such as the spacer 25 in contact with the uppermost core rod segment 18, acts to fix the positions of all of the segments 18 with respect to the overclad tubes during fiber draw. In the disclosed embodiment, the segments 18 are restrained from movement either downward or upward with respect to the overclad tubes 20, 21, and a constant feed rate through the hot zone 15 of the furnace 14 is achieved for all components of the assembled preform 10.

An optical fiber preform comprised of multiple stacked core rod segments and at least two continuous overclad glass tubes having different physical properties, has been disclosed herein. The core rod segments may originate from a single long core rod, wherein the segments are cut away from the rod using, e.g., a diamond saw to ensure that flat end faces of adjacent segments are stacked tightly flush with one another inside the innermost tube, and that the useful length of the stacked segments approaches that of the overclad tubes themselves. Three or more overclad tubes may also be used to form an optical fiber preform in accordance with the present invention. The first overclad tube 20 may itself be in the form of a number of tube sections that are supported axially end to end inside the second overclad tube 21.

For example, a preform having an OD of 90 mm may comprise a thin first overclad tube having a wall thickness of about 5 mm and a hydroxyl (OH) impurity concentration of not more than about 0.3 ppm to control the quality of the core rod-to-tube interface. A second overclad tube having a wall thickness of about 28 mm and a hydroxyl impurity concentration of 1.0 or more ppm may then be used to obtain less expensive fiber cladding material without affecting fiber quality.

The core rod segments 18 may be cut to fill the entire length of the first overclad tube 20. Tightly flush joints between adjacent segments will not negatively impact the draw process (e.g., no fiber break), but will impart a distinct identifiable "signature" in the form of variations in line speed and fiber cladding diameter. The identified joint regions can then be removed in a post draw operation, using techniques and procedures currently known in the art. Since there is no prior welding of the segments, there is no added hydroxyl concentration.

In summary, the use of multiple overclad tubes allows for a high quality (i.e., low impurity content) glass to form the interface between the core rod segments and the first overclad tube, without requiring the outer overclad tube or tubes to meet more stringent purity requirements. Longer length performs and larger preform diameters can thus be achieved, thereby improving process efficiencies and lowering manufacturing costs while ensuring high fiber quality.

While the foregoing represents a preferred embodiment of the invention, it will be understood by persons skilled in the art that various modifications and changes can be made without departing from the spirit and scope of the invention. For example, the present invention may be applied in the multi-tube assembly of the earlier mentioned U.S. Pat. No. 6,460,378, or in other assemblies that do not incorporate a plug similar to the plug 22 in the presently disclosed embodiment. Accordingly, the present invention includes all such modifications and changes as come within the scope of the following appended claims.

I claim:

1. An overclad optical fiber preform, comprising:
    a first glass overclad tube having a tube axis, and a number of core rod segments arranged axially end to end inside the first overclad tube;
    the first overclad tube has a first wall thickness and a first concentration of a given impurity in the first overclad tube, and the impurity includes one or more dopants or chemicals that contribute to signal attenuation in a fiber to be drawn from the preform; and
    a second glass overclad tube disposed coaxially about the first overclad tube, wherein the second overclad tube has a second wall thickness and a second concentration of the given impurity in the second overclad tube, and each of the first and the second overclad tubes are circular cylindrical in form;
    the second concentration of the given impurity in the second overclad tube is greater than the first concentration of the impurity in the first overclad tube;
    the first wall thickness of the first overclad tube is minimally about 4 mm, and the second wall thickness of the second overclad tube is at least about 28 mm and is substantially greater than the first wall thickness of the first overclad tube by an amount sufficient to obtain a certain cladding to core mass ratio for the fiber to be drawn from the preform; and
    wherein the signal attenuation in the fiber is substantially unaffected by the greater concentration of the given impurity in the second overclad tube.

2. A preform according to claim 1, wherein the given impurity is a member of the group comprising OH, Cl, Al, Fe, Ca, Mg, K, Na, Li, Ni, Cr, Cu, Ti, V and Zn.

3. A preform according to claim 1, wherein the given impurity is OH and the first concentration of OH contained in the first overclad tube is not more than 0.3 parts per million (ppm).

4. A preform according to claim 1, wherein a distal end of the second overclad tube is tapered radially inward at a determined taper angle.

5. The preform of claim 4, wherein the taper angle is about 24 degrees.

6. A preform according to claim 1, including a spacer disposed at a proximal end of the second overclad tube for restraining movement of the first overclad tube and the core rod segments in the direction of said proximal end.

7. A preform according to claim 6, wherein the spacer has passages for communicating a vacuum to corresponding radial gaps formed between (i) the core rod segments and the first overclad tube, and (ii) the first overclad tube and the second overclad tube.

8. A preform according to claim 7, wherein each radial gap extends approximately 1 millimeter.

9. An optical fiber preform according to claim 1, wherein the first wall thickness is between about 5 mm and 10.5 mm, and the second wall thickness is between about 28.5 and 47.5 mm.

10. An optical fiber preform according to claim 9, wherein the first overclad tube has an outer diameter of between 32 mm and 54 mm, and the second overclad tube has an outer diameter of between 90 mm and 150 mm.

* * * * *